United States Patent [19]

Bentz

[11] Patent Number: 5,016,945
[45] Date of Patent: May 21, 1991

[54] ARRANGEMENT FOR CONNECTING AND MOVING THE PLATES OF A CATERPILLAR TRACK OF EARTH-MOVING MACHINES

[75] Inventor: Helmut Bentz, Dortmund, Fed. Rep. of Germany

[73] Assignee: O & K Orenstein & Koppel Aktiengesellschaft, Dortmund, Fed. Rep. of Germany

[21] Appl. No.: 471,770

[22] Filed: Jan. 26, 1990

[30] Foreign Application Priority Data

Feb. 8, 1989 [DE] Fed. Rep. of Germany ....... 3903617

[51] Int. Cl.$^5$ ............................................. B62D 55/21
[52] U.S. Cl. .................................. 305/58 PC; 305/57
[58] Field of Search ............ 305/56, 57, 58 R, 58 PC, 305/59, 14, 42

[56] References Cited

U.S. PATENT DOCUMENTS

| | | | |
|---|---|---|---|
| 1,100,148 | 6/1914 | Perry | 305/58 R X |
| 1,694,035 | 12/1928 | Grotts | 305/14 |
| 1,975,107 | 10/1934 | Knox et al. | 305/58 R X |
| 2,914,360 | 11/1959 | Duclot | 305/58 R X |
| 3,531,165 | 9/1970 | Comellas | 305/14 X |
| 3,958,836 | 5/1976 | Brown et al. | 305/58 PC X |
| 4,150,856 | 4/1979 | Hakkenberg et al. | 305/58 R X |
| 4,163,589 | 8/1979 | Fox et al. | 305/59 X |
| 4,265,084 | 5/1981 | Livesay | 305/59 X |
| 4,324,437 | 4/1982 | Narang | 305/58 R X |

FOREIGN PATENT DOCUMENTS

80/02059 10/1980 World Int. Prop. O. ...... 305/58 PC

Primary Examiner—Russell D. Stormer
Attorney, Agent, or Firm—Martin A. Farber

[57] ABSTRACT

An arrangement for connecting and moving the plates of a caterpillar track of earth-moving machines in which adjacent chain plates bridge over on a common axis by, in each case, two inner or outer straps having bore holes. A solid chain pin which is moveable in circumferential direction and having a free central region for the action of sprocket-wheel teeth is mounted in the holes.

4 Claims, 1 Drawing Sheet

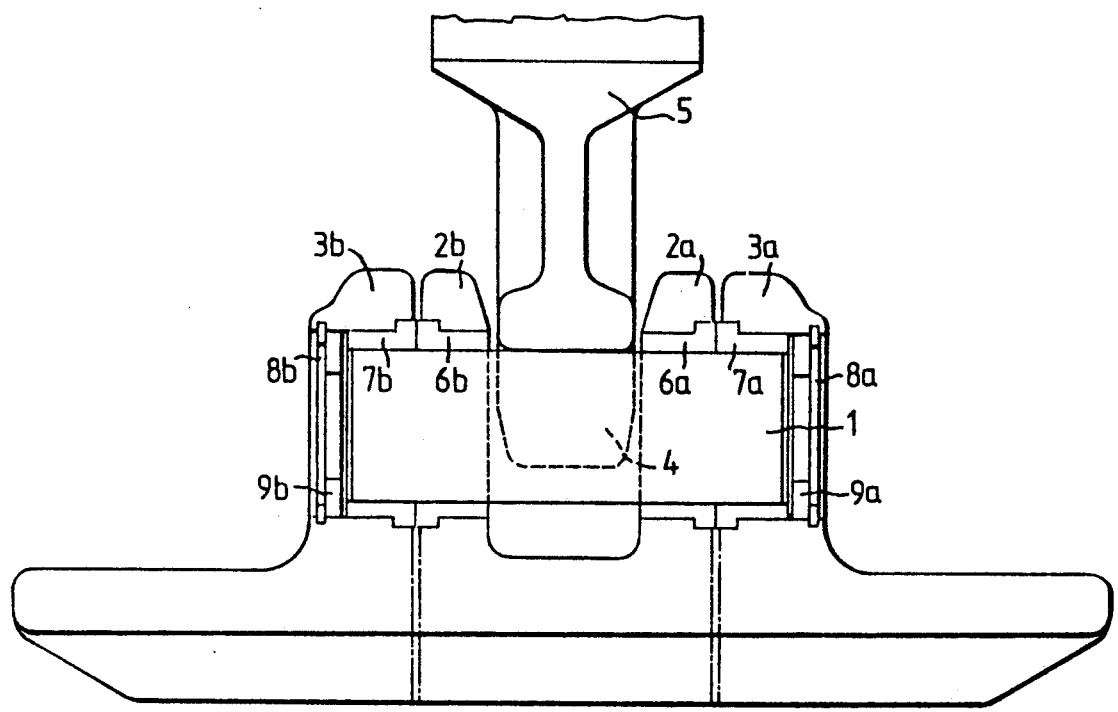

ARRANGEMENT FOR CONNECTING AND MOVING THE PLATES OF A CATERPILLAR TRACK OF EARTH-MOVING MACHINES

FIELD AND BACKGROUND OF THE INVENTION

The invention relates to an arrangement for connecting and moving the plates of a caterpillar track of earth-moving machines in which adjacent track plates are bridged over on a common axis by, in each case, two inner or outer straps having bore holes.

A chain drive for caterpillar tractor vehicles is already known which consists of a drive-sprocket wheel as well as a caterpillar track, the links of which are pivotally connected to each other. The arrangement is such that in each case a single lug of one link is pushed between the two parts, spaced from each other, of the fork-shaped double lug of the adjacent link whereupon the two links are pivotally connected together by means of a pin (Federal Republic of Germany AS 22 59 352).

This has the disadvantage that the pin is completely surrounded by the links so that the drive sprocket wheel must cooperate with supporting surfaces of the links.

It has furthermore already been proposed in an arrangement corresponding to the introductory mentioned type, to connect the outer straps of the chain plate by a pin which is pressed into position and is surrounded by a bushing in the region of inner straps of the chain plate. This bushing is firmly seated in the bore holes of the inner straps of the chain plate.

The disadvantage of such an arrangement is that all movements of the chain are accompanied by a relative movement between the pin and the bushing. This results in wear. The bushing can also bulge out upon the sprocket-wheel tooth engagement, particularly during the nonlinear displacement of the apparatus, and consequently lead to damage to the chain.

SUMMARY OF THE INVENTION

It is an object of the invention, in an arrangement in accordance with the introductory paragraph herein, to improve the undercarriage of an earth-moving machine in order thereby to increase the time of availability for use of the apparatus.

According to the invention, a solid or massive chain pin (1) which is moveable in circumferential direction and has a central region which is free for the engagement in the sprocket-whell teeth (4) is mounted in the bore holes.

The advantage of the solution in accordance with the above-mentioned invention is that the turnably mounted chain pin can engage directly between the teeth of the sprocket wheel. The pin then rotates in its bearings but is at a standstill, however, on the sprocket wheel. The pin is thus subjected to wear over its entire circumference. Furthermore, breaking of bushings is avoided.

Furthermore, the pin, which consists of a material which is softer than the hardened sprocket wheel, can be replaced at less expense.

According to another feature of the invention each bore hole, in the inner and outer straps, has a bushing (6a, 6b, 7a, 7b) in which the chain pin (1) is mounted.

Moreover, the invention provides that the chain pin (1) is secured in its axial position by snap rings (8a, 8b) with supporting washers (9a, 9b).

BRIEF DESCRIPTION OF THE DRAWING

With the above and other objects and advantages in view, the present invention will become more clearly understood in connection with the detailed description of a preferred embodiment, when considered with the accompanying drawing in which the only figure of the drawing is a schematically illustrated embodiment of the invention.

DETAILED DESCRIPTION OF THE PREFERRED EMBODIMENT

Referring to the drawing, it should be clear that a chain pin 1 is turnably mounted in bore holes of, in each case, two inner straps (projections or joint bars) 2a, 2b or outer straps (projections or joint bars) 3a, 3b of a chain plate. Sprocket wheel teeth 4 act on its accessible free central region. The sprocket wheel is designated 5.

The bore holes in the chain inner straps 2a, 2b have inner strap bushings 6a, 6b and, correspondingly, chain outer-strap bushings 7a, 7b.

The chain pin 1 is secured in its axial position by snap rings (locking or snap rings) 8a, 8b with supporting washers 9a, 9b.

When the chain pin 1 now engages, as a result of the rotation of the sprocket wheel 5, between the individual teeth 4 of the sprocket wheel 5 at the point of reversal of the chain, then there results a pressing supporting of the chain pin 1 on the sprocket wheel 5. As a result in accordance with the invention and in advantageous fashion, no movement takes place between these two parts during the engagement since the chain pin 1 does not rotate relative to the teeth 4 of the sprocket wheel 5 since the chain pin 1 is turnably mounted in the bore holes of the inner and outer straps 2a, 2b, 3a, 3b. In this way, wear is avoided.

I claim:

1. In an arrangement for connecting and moving track plates of a caterpillar track of earth-moving machines in which adjacent track plates are bridged over on a common axis by, respectively, two inner straps or outer straps having bore holes, the improvement comprising a solid chain pin which is moveable in circumferential direction and has a central region which is free for engagement in sprocket-wheel teeth of a drive sprocket wheel, wherein said chain pin is turnably mounted in the bore holes.

2. The arrangement according to claim 1, wherein each bore hole, in said inner and outer straps, has a bushing, in which the chain pin is mounted.

3. The arrangement according to claim 1, further comprising means comprising snap rings with supporting washers for helping secure said chain pin in its axial position.

4. The arrangement according to claim 1, wherein said pin is made of a material which is softer than that of the material of a hardened sprocket wheel having said teeth.

* * * * *